United States Patent [19]

Ulrich

[11] 4,368,605
[45] Jan. 18, 1983

[54] AUTOMOBILE LOUVER ASSEMBLAGE

[76] Inventor: Everette R. Ulrich, 5631 SW. 8th Ct., Plantation, Fla. 33317

[21] Appl. No.: 189,282

[22] Filed: Sep. 22, 1980

[51] Int. Cl.$^3$ .............................................. E04B 7/08
[52] U.S. Cl. ........................................ 52/473; 49/62; 296/95 R
[58] Field of Search ................. 52/473; 296/95, 97 A; 49/61, 62, 67, 71; D12/181

[56] References Cited

U.S. PATENT DOCUMENTS

| | | | |
|---|---|---|---|
| 2,758,534 | 8/1956 | Smith | 52/473 X |
| 3,083,630 | 4/1963 | Thaxton | D12/181 X |
| 3,394,518 | 7/1968 | Worrell | 52/473 |
| 3,755,988 | 9/1973 | Van Der Sluys | 52/473 |
| 4,006,933 | 2/1977 | Simpson | 52/473 X |
| 4,204,368 | 5/1980 | Lockshim | 296/95 R X |
| 4,232,483 | 11/1980 | Lockshim | 296/95 R X |
| 4,248,022 | 2/1981 | Walker | 52/473 |

FOREIGN PATENT DOCUMENTS 1128130  1/1957  France .................. 52/473

OTHER PUBLICATIONS

"Torino Road Test", Advertisement Motor Trend Magazine, Feb. 1970, p. 34.
"Chastains Shadow", Brochure for Rear Window Shade.
"Rear Window Sun Shade", Korky's Kustom Studios Brochure.
"Chastains Shadow", Roger Chastain Associates.

*Primary Examiner*—J. Karl Bell
*Attorney, Agent, or Firm*—Ernest H. Schmidt

[57] ABSTRACT

A plurality of stamped sheet-metal louver vanes are supported in relatively fixed, parallel relation at each end by a pair of extruded metal side channel members having longitudinally extending slots into which marginal end portions of the louver vanes are inserted. The louver vanes are securely retained in place with the use of metal clip members supported in through openings in marginal end portions of the vanes, the clip members being operative, upon such insertion of the vane end marginal portions to interhookingly engage inner hook wall portions of the side channel member slots.

8 Claims, 5 Drawing Figures

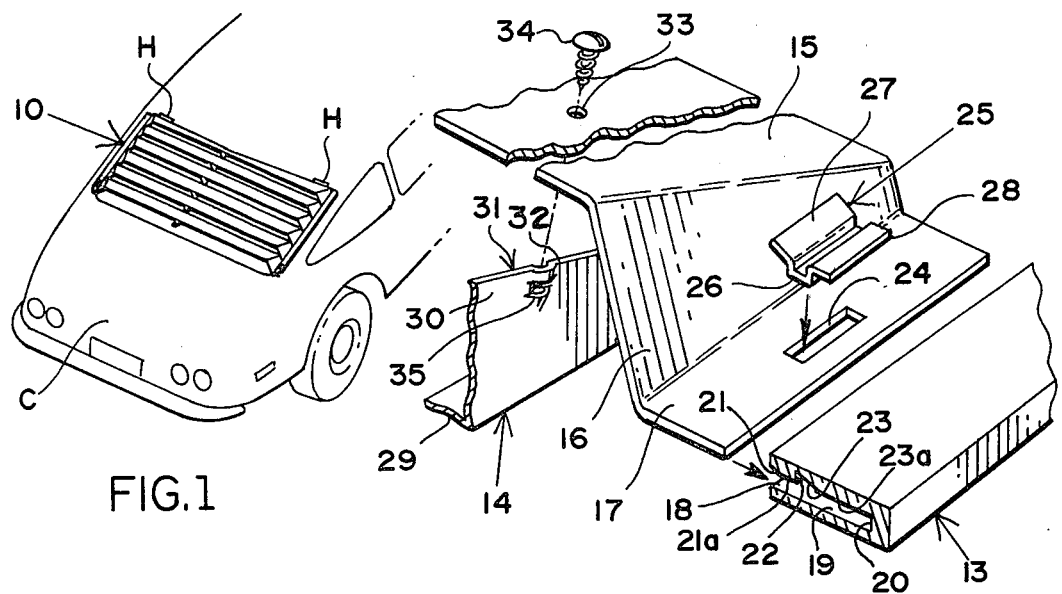
FIG.1
FIG.5
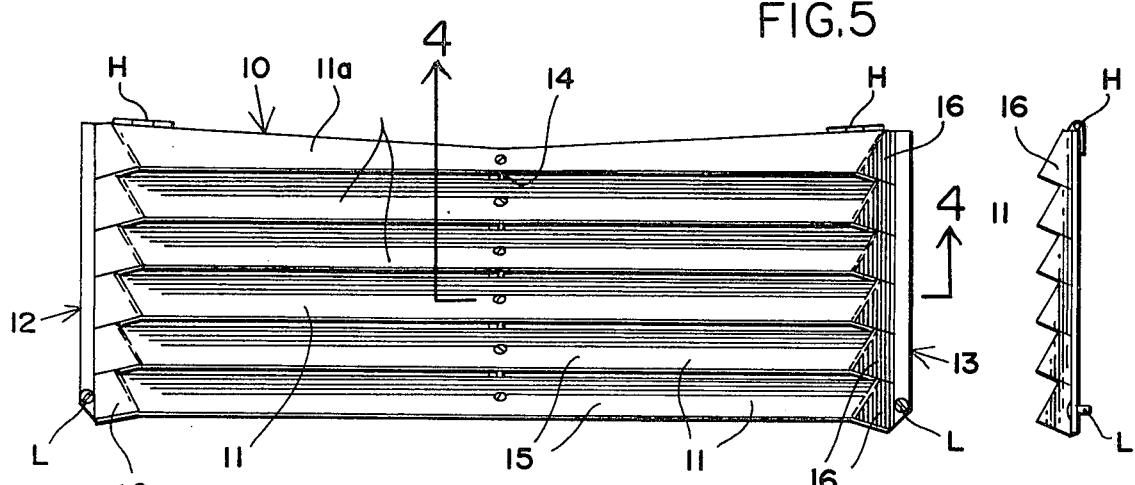
FIG.2
FIG.3
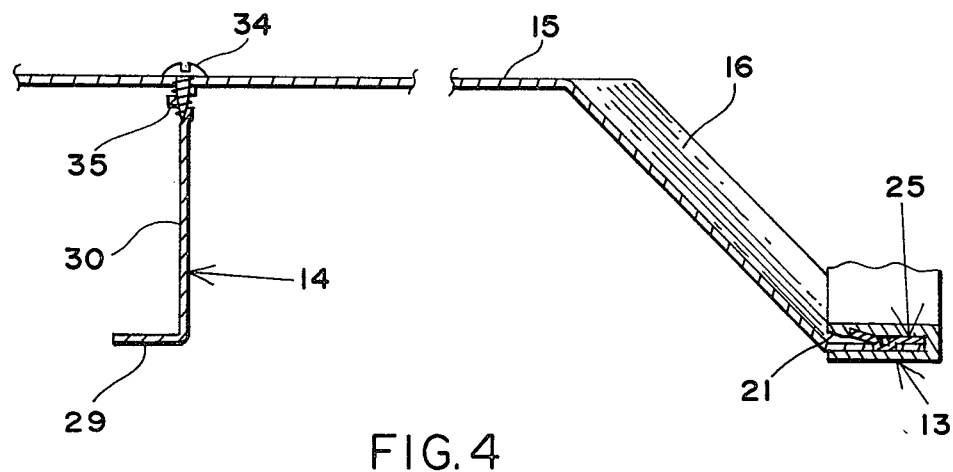
FIG.4

AUTOMOBILE LOUVER ASSEMBLAGE

BACKGROUND OF THE INVENTION

This invention relates to sunshade louvers for automobiles, and is directed particularly to an improved construction of such louvers providing for quick and easy assemblage thereof from a kit of the individual parts.

Various types of rear window sunshade louvers for automobiles, more particularly sports cars, have heretofore been devised, substantially, all of which are fabricated of stamped or otherwise formed sheet-metal vanes supported in relatively fixed, parallel relation with the use of interjoining side members. If prefabricated at the factory, marginal end portions of the metal vanes are commonly staked in U-shaped channels formed along the side members. If designed to be shipped and sold in "knock-down" condition as a set of parts for assemblage by the purchaser or user, the vane marginal end portions are secured to the side members with the use of either machine screws or sheet-metal screws. These methods of assembly heretofore known have been found to be deficient in various respects. For example, in the prefabricated assemblage, staking together of the parts is undependable in achieving secure mechanical interconnection. Moreover, neither method is suitable for assemblage from a kit by the user. Thus, while the use of machine screws or sheet-metal screws enables assemblage from a kit of the parts, this is a difficult and tedious task because of the great number of screws and screwdriver operations required.

It is, accordingly, the principal object of this invention to provide a novel and improved mechanism for the assemblage of automobile louvers which lends itself equally well either to prefabrication at the factory, or assemblage from a kit of the parts by the user or purchaser.

A more particular object of the invention is to provide a novel and improved method and means for the assemblage of automobile louver vanes to their supporting side channel members wherein stamped sheet metal clips fitted in openings in marginal end portions of the louver vanes serve to interhookingly engage against hook wall portions within longitudinally extending slots in the side channel member into which the vane ends are inserted.

Another object of the invention is to provide an automobile louver construction of the above nature wherein the marginal end portions of the louvers, fitted with their interhooking clips, can readily be manually inserted into their respective side channel members in side-to-side, abutting relation therealong by a simple manual pushing operation and without the use of tools.

Yet another object of the invention is to provide an automobile louver assemblage of the character described which is particularly well suited to fabrication in "knock-down" or kit form because of the simplicity and ease with which assembly can be done by the purchaser or user.

Other objects, features and advantages of this invention will be apparent from the following description when read with reference to the accompanying drawings.

BRIEF DESCRIPTION OF THE DRAWINGS

In the drawings, wherein like reference numerals denote corresponding parts through the several views:

FIG. 1 illustrates, in perspective, an automobile louver assemblage embodying the invention installed against the rear window of an automobile;

FIG. 2 is an outside elevational view of the louver assemblage, shown separately;

FIG. 3 is a side elevational view thereof;

FIG. 4 is a partial, transverse, cross-sectional view, taken along the line 4—4 of FIG. 2 in the direction of the arrows, on an enlarged scale; and FIG. 5 is a fragmentary "exploded" view, in perspective, of portions of a louver vane and its associated side channel and center support bracket, illustrating how they are interconnected in assembly by the method and means of the invention.

Referring now to the details of the drawings, reference numeral 10 in FIGS. 1, 2 and 3 designates, generally, a preferred form of automobile louver assemblage embodying the invention, the same being illustrated as installed against the rear window of a typical sports car C in FIG. 1. The louver assemblage 10 comprises a plurality of louver vanes 11 and 11a supported in parallel interconnected relation by side channel members 12 and 13 and a center support bracket 14. The louver vanes 11, which are preferably stamped or otherwise fabricated of sheet aluminum, are comprised of elongate body portions 15, the ends of which are integrally formed with angularly-bent sidewall portions 16 terminating in outwardly-bent, substantially rectangular end portions 17. It is to be particularly noted that the bend between the body portion 15 of the vanes 11 or 11a and the respective sidewall portions 16 thereof, and between the sidewall portions 16 and rectangular end portions 17, are such that said rectangular end wall portions of each vane will lie in a common plane. The bends are at each angles, moreover, that when the louver vanes are fitted side-to-side upon assembly, the edges of the sidewall portions 16 will be in abutting relation.

A salient feature of the invention resides in the mechanism by means of which the rectangular end portions 17 of the louver vanes are secured at each end to their side channel members 12, 13. As best illustrated in FIGS. 4 and 5, the side channel members 12, 13 are of substantially rectangular cross-sectional shape, and preferably fabricated of aluminum for extrusion with a locking slot 18, said slot being open along one edge for the interconnecting reception of rectangular end portions 17 of the louver vanes in the manner now to be described.

As best illustrated in FIG. 5, the bottom surface 19 of the locking slot 18 is flat, and parallel with the major or top and bottom surfaces of the side channel member. The inner end of the locking slot 18 extends perpendicularly upwardly with respect to slot bottom surface 19, as indicated at 20, to be in spaced, parallel relation with the outer sidewall of the channel member. The upper surface of the locking slot 18 is defined by an angularly-directed mouth surface portion 21, convergant to the bottom surface 19 in the inward direction. The inner end of the mouth surface portion 21, merges with a flat, horizontal upper surface portion 21a which, in turn, meets with an upwardly-extending, inner hook wall portion 22. The inner edge of inner hook wall portion 22 extends convergently downward at an angle of approximately 10 degrees, as indicated at 23, to merge with the outer end of a horizontal upper surface portion 23a of the locking slot 18. The inner edge of horizontal upper surface portion 23a extends from the upper edge of upwardly-extending portion 20 at the inner end of the slot.

As means for mechanically interconnecting the rectangular end portions 17 of the louver vanes in their respective channel members 12, 13, each end portion is punched with a longitudinally-extending, rectangular opening 24 receivable within which is a formed stainless steel sheet-metal locking clip 25. As best illustrated in FIG. 5, the locking clip 25 is rectangular in shape, and formed along its length with a shallow, central, substantially rectangular channel portion 26, the opposed legs of which merge at one side with an angularly-upwardly-extending first wing portion 27 and a comparatively short right angularly-outwardly-extending wing portion 28. The channel portion 26 of the locking clip 25 is of such size as to fit closely within its rectangular opening 24 in a louver vane, with the comparatively short wing portion 28 extending outwardly of its vane end portion 17. To assemble the vanes thereafter, it is only necessary to push the end portions 17 thereof, together with an inserted locking clip 25, into the locking slot 18 of its associated side channel member 12 or 13, it being understood that the combined thickness of each of said end portions and the wing portions of the associated locking clip will be approximately equal to the height of said slot opening at the mouth thereof, i.e., the vertical distance between the slot bottom surface 19 and the inner end of the angularly-directed mouth surface portion 21.

Upon such assemblage, as illustrated in FIGS. 4 and 5, the lagging or angularly bent upwardly-extending wing portions 27 of the clip will be constrained to bend in the downward direction to pass under the inner edge of the channel slot mouth surface portion 21, whereupon, after full insertion as illustrated in FIG. 4, the inner edge of said wing portion will past just beyond to spring up again behind upwardly-extending inner hook wall portion 22. When so interhookingly assembled, it will be understood that it will be virtually impossible to laterally withdraw louvers from their side channel members without destruction. The relative sizes of the channel slots 18, the louver rectangular openings 24, and the locking clips 25, moreover, will be such as to be close-fitting, as illustrated in FIG. 4, thereby as to preclude the possibility of longitudinal movement of the vanes in their side channel members. It will thus be apparent that the louvers 11, 11a can readily be manually assembled to the side channel members 12, 13, one at a time, in edge-to-edge abutting relation, as illustrated in FIGS. 2 and 3.

As illustrated in FIGS. 2, 4 and 5, the bent sheet metal support bracket 14, is provided for positionally supporting the louvers 11, 11a at central portions therealong. Thus, as best illustrated in FIGS. 4 and 5, the center support bracket 14 comprises an elongated, rectangular base portion 29, bent perpendicularly upwardly along one side of which is upstanding sidewall portion 30 having a saw-toothed upper edge 31 defining angularly inclined upper edge portions 32 of such length, inclined at such an angle, and of such height as to abut one edge each against underside portions of the assembled louvers 11, 11a. As illustrated in FIGS. 4 and 5, each louver 11, 11a is provided, centrally along its length, with a sheet-metal screw opening 33 for the reception of a sheet-metal screw 34 receivable in a laterally stamped sheet-metal screw opening 35 provided at the upper edge of each of the abutting surface portions of the support bracket 14. The thus assembled louver, as illustrated by way of example in FIGS. 2 and 3, will be provided at each side of its upper end with a hinge member H, by means of which it can be fitted against the rear window of a vehicle C in the usual and customary fashion. The lower end of the louver assemblage may be provided at each side with through openings for the reception of manual or key-locking mechanism, indicated as L in FIG. 2, by means of which the louver assemblage may be withdrawably secured along the bottom framework at the rear window of the vehicle. Since the hinge attachment mechanism H and the locking mechanism L form no part of the present invention and are commonly used in the installation of automobile louvers, they are not further described herein.

As will be understood from the foregoing, a salient feature of the invention resides in the simplicity with which the louvers are assembled to the side channel members without the use of screws, hand tools, punch-presses or the like, as heretofore required. The assembly method of the invention is thus particularly well suited to fabrication from a kit by the user who wishes to equip his automobile with a rear window louver. Once the louver vanes are manually assembled to the side channel members as described above, it is also a simple matter to assemble the central support bracket 14 with the use of a screwdriver.

While I have illustrated only one form in which the invention can conveniently be embodied in practice, it is to be understood that this embodiment is presented by way of example only and not in a limiting sense. The invention, in brief, comprises all the embodiments and modifications coming within the scope and spirit of the following claims.

What I claim as new and desire to secure by Letters of Patent is:

1. An automobile louver assemblage comprising, in combination, a plurality of elongate sheet metal vane members of substantially equal length, a pair of elongate, substantially equal side channel members, each side channel member having a longitudinally extending slot for the insertive reception of marginal end portions, respectively, of said louver vane members when said vane members are disposed in co-extensive parallel relation, hook means operative upon the insertion of said marginal end portions of said vane members in said side channel slots for preventing their subsequent withdrawal from said side channel members, said hook means comprising a plurality of spring clips, one for each marginal end portion of said plurality of vane members, and a through opening in each of said vane member marginal end portions for the interfitting reception, one each, of said spring clips.

2. An automobile louver assemblage as defined in claim 1 wherein each of said spring, clips when inserted in its vane member slot, has an inwardly-directed, transversely-extending edge portion, said channel member being longitudinally extruded of metal to define said longitudinally extending slots, said slots being formed along their lengths with an inner hook wall portion for abutting contact therewith, of said transversely extending edge portions of said spring clips.

3. An automobile louver assemblage as defined in claim 2 wherein said vane member marginal end portion openings are of elongate, rectangular shape extending transversely of their respective vane members, and wherein said spring clips are of stamped sheet metal defining, in cross-section, a substantially rectangular channel portion receivable in said rectangular openings and the opposed legs of which merge with angularly extending, flat, opposed wing portions, said transversely extending edge portion being defined by the inwardly directed one of said opposed wing portions.

4. An automobile louver assemblage as defined in claim 3 wherein said inwardly directed one of said opposed wing portions is angularly upwardly directed with respect to its associated channel portion leg, and wherein said opposite wing portion extends outwardly of its associated channel member leg at a right angle.

5. An automobile louver assemblage as defined in claim 4 wherein said first mentioned clip wing portion is of greater length than said second mentioned wing portion.

6. An automobile louver assemblage as defined in claim 2 wherein said channel member slots are formed along their length with an angularly directed mouth surface portion, the inner end of which extends into said inner hook wall portion, the minimal height of said slot at said mouth portion being substantially equal to the combined thickness of said louver vane member and said wing portions of said spring clips.

7. An automobile louver assemblage as defined in claim 2 wherein said louver vane members are fabricated of sheet metal and comprise elongate body portions the ends of which are integrally formed with angularly bent sidewall portions terminating in said marginal end portions.

8. An automobile louver assemblage as defined in claim 7 wherein said vane members, said channel members and said spring clips are supplied in kit form for assembly by the user.

* * * * *